United States Patent [19]

Frey

[11] 4,326,654
[45] Apr. 27, 1982

[54] MOTOR VEHICLE ROOF CARRIER FOR THE AFFIXATION OF SKIS AND OTHER OBJECTS TO BE TRANSPORTED

[76] Inventor: Dieter Frey, Angerstrasse 9, D-8100 Garmisch-Partenkirchen, Fed. Rep. of Germany

[21] Appl. No.: 43,910

[22] Filed: May 30, 1979

[30] Foreign Application Priority Data

May 30, 1978 [DE] Fed. Rep. of Germany ... 7816134[u]

[51] Int. Cl.$^3$ .......................... B60R 9/04; B60R 9/12
[52] U.S. Cl. .................................. 224/315; 224/331; 224/917
[58] Field of Search ............... 224/315, 322, 323, 324, 224/329–331, 917, 320; 70/58

[56] References Cited

U.S. PATENT DOCUMENTS

| | | | |
|---|---|---|---|
| 3,348,747 | 10/1967 | Vuarchex | 224/323 |
| 3,601,294 | 8/1971 | Gjesdahl | 224/917 |
| 3,638,844 | 2/1972 | Bronson | 224/323 |
| 3,702,167 | 11/1972 | Olson | 224/331 |
| 3,710,998 | 1/1973 | Marker | 224/331 |
| 3,719,297 | 3/1973 | Nowicki | 224/324 |

Primary Examiner—Stephen Marius
Attorney, Agent, or Firm—Kontler & Grimes

[57] ABSTRACT

A motor vehicle roof carrier for the affixation of skis and other ojbects to be transported, consisting of a carrier tube which is constituted by two pieces (1, 1') shiftable for width adjustment, and clamping parts (3, 6) shiftable relative to one another by means of a spindle (4) for the affixation of the roof carrier at the rain channels of the vehicle roof. Herein, the spindle (4) which moves the clamping part (6) passes through the tube (1) from above and, in addition thereto, there is provided an additionally mountable and closeable securing device including a latching member (9) insertable into and shiftable in an open end of the carrier tube (1), as well as a securing lever (17) which is to be pivotally connected at one of its ends (22) on the carrier tube, (1), the opposite end (19) of which is provided with a hook (20) that can be engaged in the latching member, which is blocked by the lock (12) in closing position, wherein the latched security bracket (17), in turn, prevents a loosening of the clamping parts (3, 6).

5 Claims, 2 Drawing Figures even though almost all of them are constructed in accordance with the same principle. Generally, they consist of a carrier tube which extends over the width of the motor vehicle roof and which carries a plurality of ski holders consisting of rubber or synthetic plastic material, the carrier tube being, as a rule, subdivided into two tubular pieces which are shiftable relative to one another for the adjustment to different roof widths. At the two ends of the carrier tube, there are provided bipartite clamps for the affixation of the roof carrier to the rain channels of the motor vehicle, which can be actuated by screws or spindles.

MOTOR VEHICLE ROOF CARRIER FOR THE AFFIXATION OF SKIS AND OTHER OBJECTS TO BE TRANSPORTED

BACKGROUND OF THE INVENTION

The invention relates to a motor vehicle roof carrier, hereafter referred to as "roof carrier", for the affixation especially of skis, but also of other transportable objects which are conveyed on carriers of this type.

Such carriers are available in a great number and have different constructions, even though almost all of them are constructed in accordance with the same principle. Generally, they consist of a carrier tube which extends over the width of the motor vehicle roof and which carries a plurality of ski holders consisting of rubber or synthetic plastic material, the carrier tube being, as a rule, subdivided into two tubular pieces which are shiftable relative to one another for the adjustment to different roof widths. At the two ends of the carrier tube, there are provided bipartite clamps for the affixation of the roof carrier to the rain channels of the motor vehicle, which can be actuated by screws or spindles.

Furthermore, there are known closeable ski holders which differentiate from the non-closeable in that a pivotable bracket is arranged upwardly of the ski holders, the one end of which can be latched in its arresting condition by a lock. In general, these closeable ski holders are preferred; their high price is considered as a disadvantage.

OBJECT AND SUMMARY OF THE INVENTION

Here the invention enters the picture and is based on the object to create a roof carrier which can be purchased as a non-closeable roof carrier and which can be changed into a closeable roof carrier with additionally purchased parts by the purchaser himself in a simple, safe and quick manner. This object includes the special object to require only a few simple and consequently relatively inexpensive parts, and to be able to change the roof carrier, in the same rapid and simple manner, from a closeable into a "normal" carrier, e.g. for the use as a conventional luggage carrier.

Hence, one can purchase, at a price which is relatively low, a non-closeable roof carrier, which is, however, fully functional as such, and, as long as one uses cheaper skis which, consequently, constitute less inducement to theft or, so long as one travels into regions which are not known as being dangerous in this respect, can use this carrier. Thereafter, when more expensive skis are purchased, or when one travels into regions which are more dangerous with respect to theft, the owner of a roof carrier according to the invention can purchase a few additional parts by means of which he can change his carrier, by resorting to a few handgrips, into a closeable carrier. However, in a similar manner, the owner of a completed roof carrier can also simply remove the additional parts and thereafter use the carrier not only for the non-secured transportation of skis, but also of other transporting objects. Consequently, the user can convert, so to say, from a "summer roof carrier" to a "winter roof carrier" and vice versa.

BRIEF DESCRIPTION OF THE DRAWING

An example of the embodiment of the invention is illustrated in FIG. 1 in a vertical section of a roof carrier half and in FIG. 2 which shows parts of the elements in FIG. 1, and the invention is described based on this example without any claim to completeness relative to components forming no part of the invention.

DESCRIPTION OF THE PREFERRED EMBODIMENTS

Figure 1:
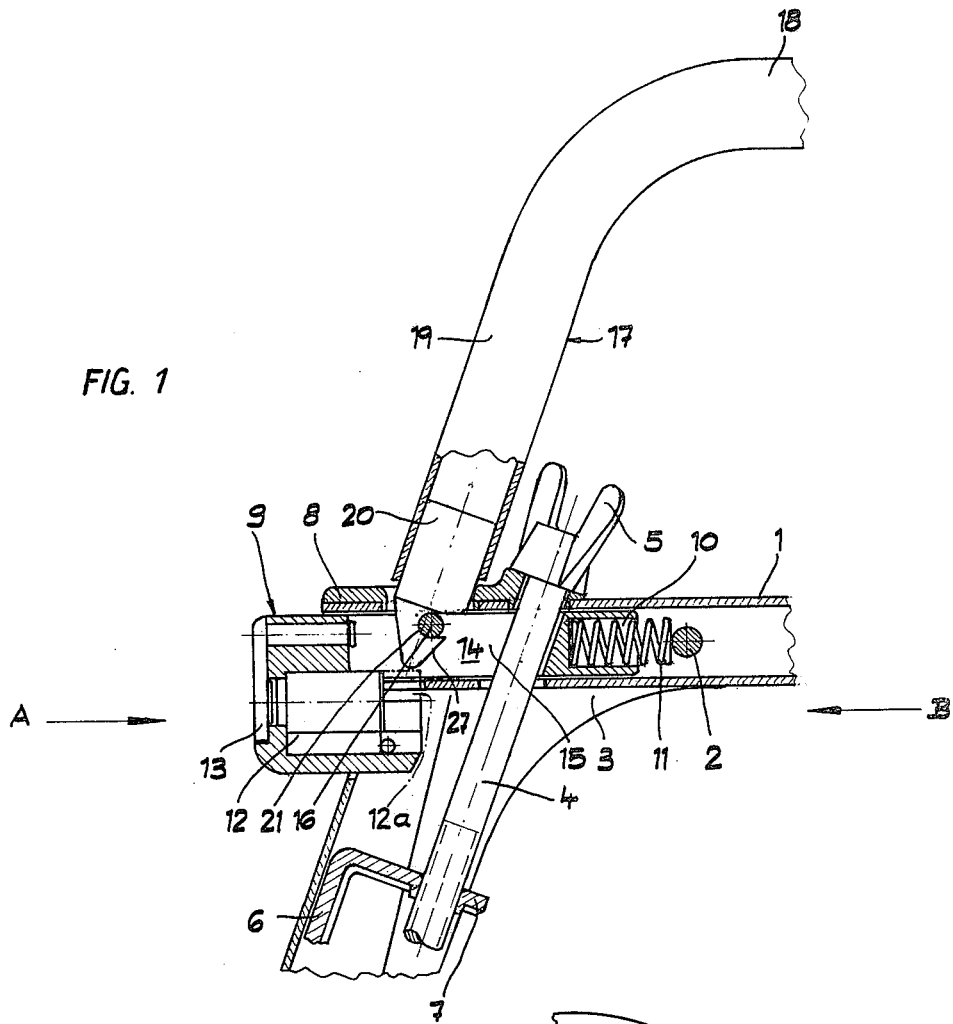
Figure 2:
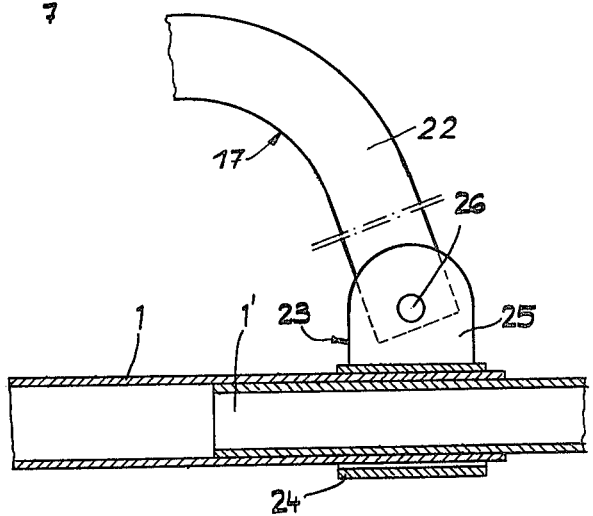

In the illustrated example, the roof carrier consists of two tubular pieces, e.g. a rectangular tubular pieces 1, the overall length of which in its telescoped-together condition corresponds to the width of a passenger car roof of the smallest width available on the market. To this end, the two tubular pieces 1 can, as shown in FIG. 2, be slid onto an intermediate piece 1', the outer dimensions of which correspond, with the corresponding tolerance, to the inner dimensions of the tubular pieces 1, but one can also simply construct the one tubular piece for telescope-type shifting within the other.

At the opposite free end of each tubular piece 1, there is affixed, by means of a rivet 2, a support foot 3 the lower end of which (not illustrated) is supported in the rain channel at the vehicle roof. A clamping part 6 which is guided on the support foot, which is inwardly bent at the lower end which is not illustrated, and which embraces the rain channel from below, can be actuated with the aid of a spindle 4 with a handle 5 and thus the carrier can be rigidly clamped at the rain channel by means of the ends of 3 and 6. To this end, an internal thread is provided in the bent end 7 of the clamping part 6, which cooperates with the outer thread of the spindle 4.

For the protection of the end region of the tubular piece 1, a synthetic plastic material cap 8 with a corresponding inclined surface is positioned on the latter, against which the lower surface of the handle 5 abuts.

A latching piece generally indicated at 9 is introducible into the free open end of the tubular piece 1 from the outside in the direction of the arrow A. When the tubular piece is rectangular in cross section, the latching piece is also rectangular and is correspondingly dimensioned and need not be secured against rotation. When the tubular piece 1 has a round cross section, the securing of the latching piece against rotation is achieved in a manner which is well known to the skilled artisan, e.g. by means of a pin guided in a groove (not illustrated).

The latching piece 9 receives at its inner end in a recess 10 a compression spring 11 which abuts against the rivet 2. Of course, the spring can be detachably connected with the rear side of the latching piece even in another suitable manner, e.g. by being slid onto an injection-molded pin.

At the outer end which is situated opposite to the spring 11, a lock 12 readily available on the market is inserted and affixed in the latching piece which is correspondingly enlarged at this location, the keyhole of which can be covered during the period of non-use by a laterally pivotable lid 13.

At the central region, the latching piece 9 is provided with a slot 15, in the lateral walls 14 of which a latching pin 16 is supported. In addition thereto, the spindle 4 which simultaneously forms an abutment for the return movement of the latching piece in the direction of the arrow B, that will be explained later, passes transversely through the slot 15.

In addition to the latching piece 9, a securing bracket which is indicated in general at 17 belongs to the parts which convert the simple roof carrier in a closeable carrier, having a horizontal part 18 extending parallel to the tubular piece 1 and which is so located, in a conventional manner, upwardly of the upper surface of the skis which are supported by the carrier, that the skis cannot be removed from between the tubular piece 1 and the bracket 17 without pivoting the latter upwardly.

A hook 20 is fitted into the laterally outer bent end 19 of the bracket, the projecting end of which is conically shaped in the illustrated example and is provided with a hook opening 21 which cooperates with the latching pin 16.

The laterally inner end 22 of the bracket 17 (FIG. 2) can be provided in a simple manner, with a bearing block 23 which consists of a collar or sleeve 24 surrounding the tubular piece 1, from which there extend two lugs 25 which are parallel to one another and spaced from each other by a distance corresponding to the width of the bracket, between which the bracket end is riveted for tilting about an axle 26. As a result of this, the bearing block 23 constitutes a part of the bracket 17, that is, it is non-detachably connected with the latter and not to the carrier so that, for the affixation of the bracket to the roof carrier, it need only be slid onto the tubular piece 1.

The actual latching operation is accomplished in the following manner: When the bracket 17 which has been previously pivoted upwardly for the positioning of the skis, is pivoted downwardly in the latching position, the inclined surface 27 of the hook end 20 eventualy contacts the latching pin 16 and shifts the latching piece 9 in its entirety, while compressing the spring 11, in the direction of the arrow A into the interior of the tubular piece 1, until the pin 16, which slides along the face 27 of the hook 20, snaps into the opening 21 of the hook 20, whereafter the latching piece 9 is shifted back by the spring 11 in the direction of the arrow B and, as a consequence thereof, the pin 16 is positively pressed into the opening 21. Now, the end of the hook 20 can be latched by the part 12a of the lock 12 which is tilted into the position illustrated in dash dash dotted lines, and the bracket is secured.

Even the spindle 4 can no longer be removed when the bracket is closed, inasmuch as one of the wings of its handle 5 abuts the bracket 17 already after a small angular displacement of the handle 5.

When it is desired to unlatch, the latching piece 9 in its entirety is shifted back, after the arresting action of the lock is discontinued, in the direction of the arrow A against the force of the spring to such an extent that the pin 16 can leave the hook opening 21.

In an advantageous embodiment of the invention, two brackets which are respectively pivotally mounted in the middle are provided for each carrier which, however, the user can, of course, purchase separately.

The free open end of a tubular piece 1 can be closed by a fitted plug of synthetic plastic material so long as the roof carrier is used as a non-closeable carrier, and thus can be protected against the penetration of dirt, moisture etc. (not illustrated).

I claim:

1. A device for supporting skis or other objects on the roof of a motor vehicle, comprising a tubular carrier having an end portion; means for clamping said carrier to the roof of the vehicle; latching means including a portion extending into the end portion of said carrier and having an elongated slot, said latching means further including a pin in said slot and said clamping means including a member traversing said end portion of said carrier and extending with clearance through said slot so that said latching means is movable lengthwise of said carrier; abutment means provided in said carrier; resilient means interposed between said abutment means and said portion of said latching mans to yieldably oppose the movement of said latching means in one direction; a securing lever having a first portion remote from said end portion of said carrier and a second portion insertable into said slot and engageable with said pin against the opposition of said resilient means; means for movably connecting said first portion of said lever to said carrier; and locking means provided on said latching means and operable to hold said second portion of said lever against disengagement from said pin.

2. The device of claim 1, wherein said clamping means further comprises a supporting foot connectable to the roof of the vehicle and said abutment means comprises a rivet connecting said supporting foot to said carrier.

3. The device of claim 1, wherein said second portion of said securing lever comprises a hook cooperating with said pin to hold said lever against movement with reference to said carriers in the operative position of said locking means.

4. The device of claim 3, wherein said hook includes a cam face which slides along said pin during movement of said hook into engagement with said pin.

5. The device of claim 1, wherein said connecting means comprises a sleeve slidably surrounding said carrier and pivot means securing said first portion of said lever to said sleeve.

* * * * *